United States Patent [19]
Wong et al.

[11] Patent Number: 5,937,009
[45] Date of Patent: Aug. 10, 1999

[54] SUB-BAND ECHO CANCELLER USING OPTIMUM WAVELET PACKETS AND CROSS-BAND CANCELLATION

[76] Inventors: Kon Max Wong, 2 Parkway Place, Dundas, Ontario, Canada, L9H 6K4; Qu Jin, 51 Lifton Crescent, Kanata, Ontario, Canada, K2L 2W3; Qiang Wu, 5020 S. Technology Loop, Apt. #30, Covallis, Oreg. 97333; Phillippe Wu, 20 Deer Field Drive, Apt.#408, Nepean, Ontario, Canada, K2G 4L2; Gordon J. Reesor, 10 Bank Street, Russell, Ontario, Canada, K4R 1A9

[21] Appl. No.: 08/784,849

[22] Filed: Jan. 15, 1997

Related U.S. Application Data

[63] Continuation of application No. 08/671,869, Jun. 28, 1996, abandoned.

[51] Int. Cl.⁶ .............................. H04L 25/34; H04M 1/00; H04B 3/20
[52] U.S. Cl. .......................... 375/286; 379/410; 370/286
[58] Field of Search .................................. 375/286, 346, 375/231, 243, 254, 285; 379/406, 345, 407, 410, 411, 88; 370/523, 289, 286, 290, 291; 348/611; 381/66, 110

[56] References Cited

U.S. PATENT DOCUMENTS

| | | | |
|---|---|---|---|
| 4,956,838 | 9/1990 | Gilloire et al. | 370/291 |
| 5,272,695 | 12/1993 | Makino et al. | 370/291 |
| 5,566,167 | 10/1996 | Duttweiler | 370/291 |
| 5,659,609 | 8/1997 | Koizumi et al. | 379/410 |
| 5,663,955 | 9/1997 | Iyengar | 370/291 |

OTHER PUBLICATIONS

Qu Jin et al., Optimum Filter Banks for Signal Decomposition and its Application in Adaptive Echo Cancellation IEEE Transactions on Signal Processing vol. 44, No. 7, pp. 1669–80. IEEE Jul. 1996, USA.

*Primary Examiner*—Chi H. Pham
*Assistant Examiner*—Khai Tran
*Attorney, Agent, or Firm*—Knobbe, Martens, Olson & Bear, LLP

[57] ABSTRACT

An echo canceller comprising a first wavelet decomposition block for decomposing a reference signal into a plurality of reference wavelet packets; a second wavelet decomposition block for decomposing an echo signal into a plurality of echo signal packets; an adaptive filter bank for receiving and filtering the reference wavelet packets and in response generating a plurality of filtered output packets replicating the echo signal packets; a plurality of subtracters for receiving and subtracting respective ones of the filtered output packets from the echo signal packets and in response generating and applying a plurality of error signals to the adaptive filter bank for modifying the transfer function of the adaptive filter bank; and a wavelet reconstruction block for receiving and reconstructing the error signals to form a residual signal from which the echo signal has been cancelled. Optimum wavelet filters for the best echo cancellation are provided, as are two wavelet echo cancellation structures.

7 Claims, 11 Drawing Sheets

SUB-BAND ECHO CANCELLER USING OPTIMUM WAVELET PACKETS AND CROSS-BAND CANCELLATION

This application is a continuation of application Ser. No. 08/671,869 filed on Jun. 28, 1996 now abandoned.

FIELD OF THE INVENTION

This invention relates in general to echo cancellation in telecommunications applications, and more particularly to the use of an optimum wavelet to maximize echo cancellation of acoustic speech signals using wavelet decomposition and to a novel method of cross-band cancellation to further increase the efficacy of echo cancellation using wavelet decomposition.

BACKGROUND OF THE INVENTION

Echo cancellation has been used extensively in telecommunications applications to recondition a wide variety of signals, such as speech, data transmission, and video. The search for mathematical algorithms to perform echo cancellation has produced many different approaches with varying degrees of complexity, cost, and performance. One common approach known as sub-band processing, involves separating the speech signal into frequency bands and processing each band separately. This has some inherent advantages, most notably reduced computational complexity and increased convergence speed over most other approaches, although practical problems have hampered its use for echo cancellation in the past.

In recent years a new method of separating signals into "sub-bands" has been developed, called wavelet decomposition and reconstruction. Wavelet decomposition is a process of band splitting, and "down sampling" (ie. the process of reducing or decimating the sample rate) of a signal into "wavelet packets". Wavelet reconstruction is the process of "up-sampling" (ie. the process of increasing the sample rate of a signal—usually done by zero insertion and anti-aliasing filtering) and re-combining the "wavelet packets" to re-generate the original signal. Wavelet decomposition and reconstruction allows the original signal to be re-generated after re-construction without distortion or degradation. This method has become popular for many different signal processing applications. However, the application of wavelet decomposition and reconstruction to the problem of echo cancellation has proven unsuccessful to date, for reasons discussed in greater detail below.

In some applications, such as the cancellation of acoustic speech echoes, the echo duration can be extremely long, on the order of 100 msec to 500 msec. A traditional approach to echo cancellation uses an adaptive transversal filter of length M, where M equals the number of samples necessary to extend just beyond the duration of the echo. The computational requirement to implement such a filter is proportional to 2M for the popular LMS (Least Mean Squares) class of algorithm, and proportional to $M^2$ or higher for algorithms such as RLS (Recursive Least Squares). The more robust algorithms (RLS being one example) have improved convergence characteristics over prior art algorithms, but the computational load increases dramatically with M. Furthermore, the convergence time increases proportionally with the size of M for most algorithms. Fast convergence is an important criteria for echo cancellation, especially for acoustic speech echo cancellation since the echo path may be continually changing as people and objects move within the environment. Prior art echo cancellers employing adaptive transversal filters capable of eliminating an echo signal having duration of 500 msec or more, have been found to suffer from problems of excessive computational complexity as well slow convergence speed.

Sub-band processing is thought to be an attractive alternative to the use of a single adaptive transversal filter for acoustic speech echo cancellation because it reduces computational complexity. By dividing the signal into N sub-bands, a filter bank of N adaptive filters must be used instead of only one. However, the sub-band signals can be down-sampled by a factor of N. Consequently, the filter outputs need only be calculated 1/N as often. Additionally, the length of the filters themselves may be reduced from length M to length M/N. This has the overall effect of reducing the computational complexity to something on the order of 2M/N for LMS type adaptive filters, while also improving convergence behaviour due to the use of shorter LMS filters. It can be seen that when M is large, there is a significant reduction in computational load, making the overhead necessary for implementing the filter banks insignificant.

The problem with the filter bank approach to sub-band processing, is that the transition between bands makes it impossible to perfectly isolate each band from each adjacent band without the use of "ideal" band pass filters (ie. filters with infinitely sharp cutoff). There is a known trade-off between the amount of echo cancellation possible, the filter roll-off, filter group delay distortion, and reconstructability of the sub-bands to regenerate the original input signal without distortion. A type of filter known as a QMF (Quadrature Mirror Filter) provides one method of filter bank design that has been used in the past to help overcome these problems. The QMF is a type of filter designed to band-split a signal, and then recombine the bands without distortion of the signal. However, the use of QMFs for echo cancellation suffers from problems relating to distortion caused by aliasing, as discussed in greater detail below.

Wavelet decomposition and reconstruction allows a sampled data signal to be separated into separate wavelet "packets" for echo cancellation, and thereafter allow for reconstruction of the original signal without any added distortion or signal degradation. In fact, the original signal can be perfectly reconstructed.

One problem with echo cancellation using wavelet decomposition is that, as indicated above, the down sampling process creates distortion in the wavelet packets due to aliasing. This effect causes the echo channel to be time-varying, which is a violation of the underlying assumption of time invariance which is required to apply known methods of adaptive filtering for speech echo cancellation. The echo channel must be both linear and time-invariant. Any processing done on the wavelet packets where the echo channel is time-varying invalidates the echo cancellation process such that signal distortion results. This limits the amount of overall allowable echo cancellation using the method of wavelet decomposition and reconstruction.

SUMMARY OF THE INVENTION

According to the present invention, an "optimum" wavelet has been developed such that the performance of wavelet decomposition and reconstruction for echo cancellation of speech is optimized. The decomposition/reconstruction process is implemented using FIR filters, the filter coefficients of which are derived from this "optimum" wavelet. A method of "cross-band" cancellation is provided in accordance with the preferred embodiment, such that distortion is reduced between adjacent bands caused by processing of the wavelet packets. This results in higher levels of echo cancellation over prior art systems.

BRIEF DESCRIPTION OF THE DRAWINGS

A detailed description of the preferred embodiment is provided herein below with reference to the following drawings, in which:

FIG. 5 shows an adaptive filter structure for use in the echo canceller of the present invention,, wherein

DETAILED DESCRIPTION OF THE PREFERRED EMBODIMENT

Figure 1:
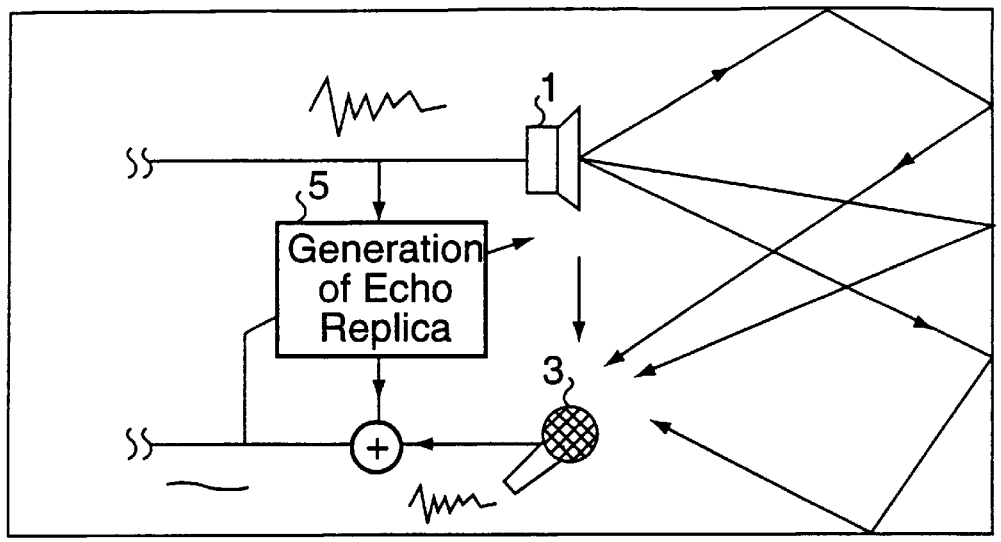
FIG. 1 is a schematic representation of how echo arises in a hands free telephone set or audio conferencing system, and the prior art approach to cancellation of such echo.

FIG. 1 shows how echo problems can arise in hands free telephone and audio conferencing systems, as well as the traditional approach to echo cancellation. A remote party voice signal is broadcast via speaker 1. This signal is then reflected off of walls, furniture, etc., in the environment of the hands free set, and picked up by microphone 3. According to standard echo cancellation methodology, a digital signal processor (DSP) 5 is used to generate a replica of the echo signal and subtract it from the microphone signal (i.e. the echo transfer function is modelled with an adaptive filter). The speaker signal forms a reference signal to the adaptive filter input of DSP 5, and the resulting signal after subtraction of the echo replica from the echo signal (i.e. the microphone input in this case) comprises an error signal which is sensed by DSP 5 and used to modify the model of the echo transfer function.

Figure 2:
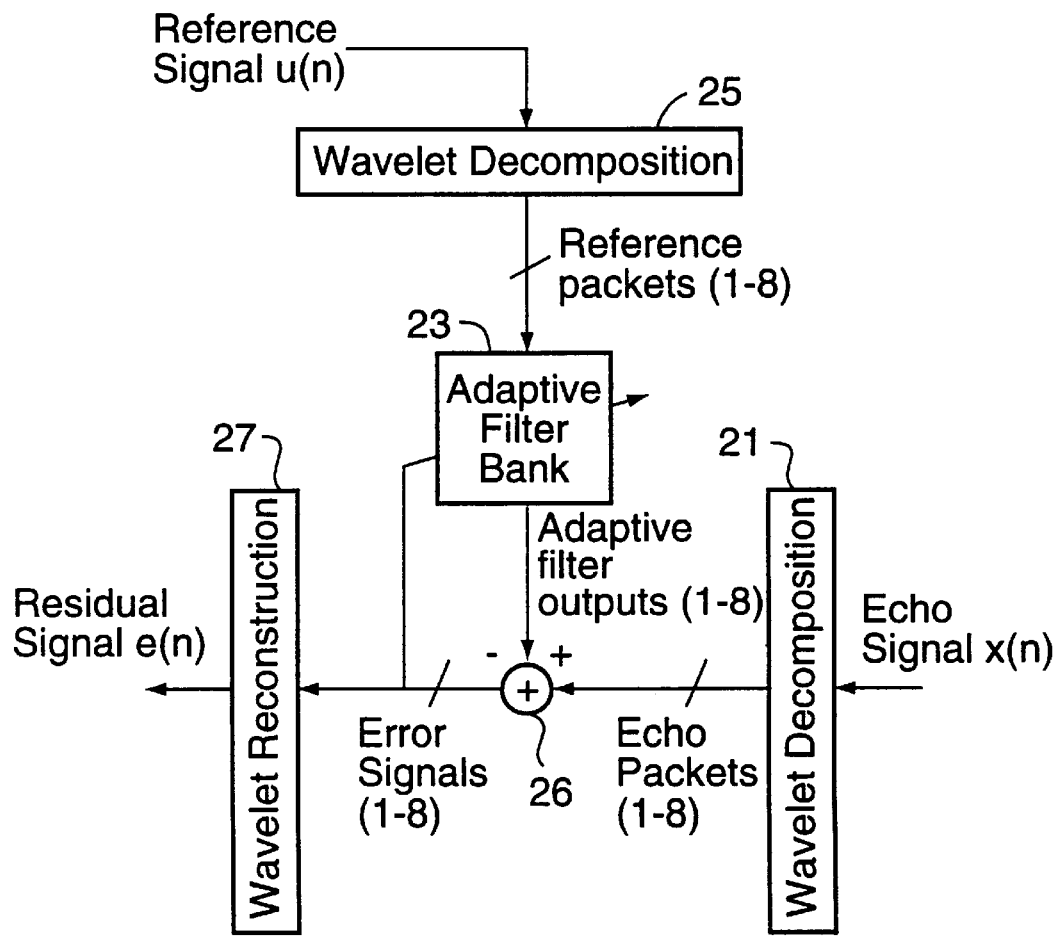
FIG. 2 is a block diagram of a sub-band echo canceller according to the present invention in its broadest aspect.

Turning to FIG. 2, a sub-band approach to echo cancellation is shown in accordance with the present invention. In operation, an echo signal x(n) is decomposed into a plurality of "sub-bands" or "wavelet packets" via wavelet decomposition block 21. An adaptive filter bank 23 is provided comprising a plurality of adaptive filters, one for each "sub-band" or "wavelet packet". A reference signal u(n) is separated into sub-bands via wavelet decomposition block 25. Cancellation of echo is performed for each sub-band separately, using a plurality of subtracters 26 (the plurality of subtracters being represented by a single summation block in FIG. 2, for ease of illustration). The results of the subtractions are error signals which are fed back to the corresponding adaptive filters 23. The error signals (which include any non-echo signals originating in the environment of the hands free set), are reconstructed via wavelet reconstruction block 27 to form a residual signal e(n) from which echo has been removed.

In FIG. 2, decomposition and reconstruction are shown relative to eight wavelet packets, although the invention may be implemented using a greater or fewer number of wavelet packets. Furthermore, as discussed in greater detail below, according to the present invention the wavelets are op by selecting particular coefficients for the FIR filters to maximize echo cancellation.

Figure 3:
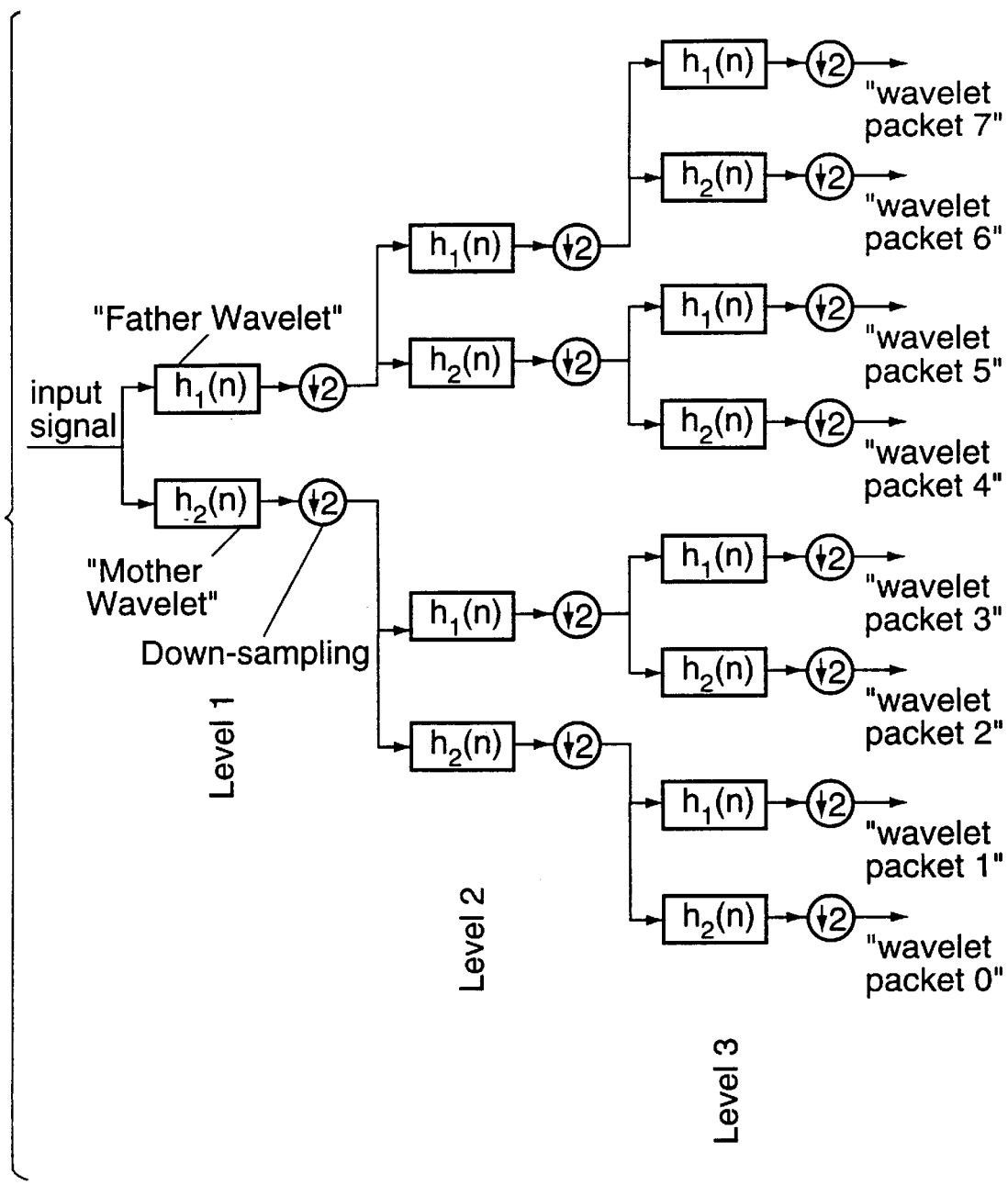
FIG. 3 is a schematic representation of a three level wavelet decomposition in which an input signal is decomposed into eight wavelet packets, in accordance with the present invention.

A three level wavelet decomposition is shown in FIG. 3 in which the input signal (eg. the reference signal u(n) or echo signal x(n) in FIG. 2) is separated into 8 wavelet packets (ie. sub-band signals). The first level convolves the input signal with a "Father" wavelet $h_2(n)$ and with a "Mother" wavelet $h_2(n)$. This splits the signal into two separate "packets". The convolutions are implemented using FIR filters of length N, the coefficients of which correspond to the wavelets. In one embodiment N was equal to 20. These resulting signals are then "down-sampled" by a factor of 2, a process in which every second sample is discarded, thus reducing the data through-put rate by 2. It should be noted that the present description is conceptual rather than literal, in order to clearly explain the underlying principles of the invention. In fact, a real implementation would not calculate all outputs of an FIR filter whose output is down-sampled, space that would be a waste of computation. The second level of decomposition splits these two packets again resulting in four wavelet "packets". These four packets are again down sampled by 2. It should be noted that FIR filters $h_1(n)$ and $h_2(n)$ are identical to the filters used in the first level discussed above (as well as in the third level). The third level of decomposition splits the signals into eight "packets", and down-samples again by a factor of 2. The resulting sample rate is eight times lower than the original sample rate.

Figure 4:
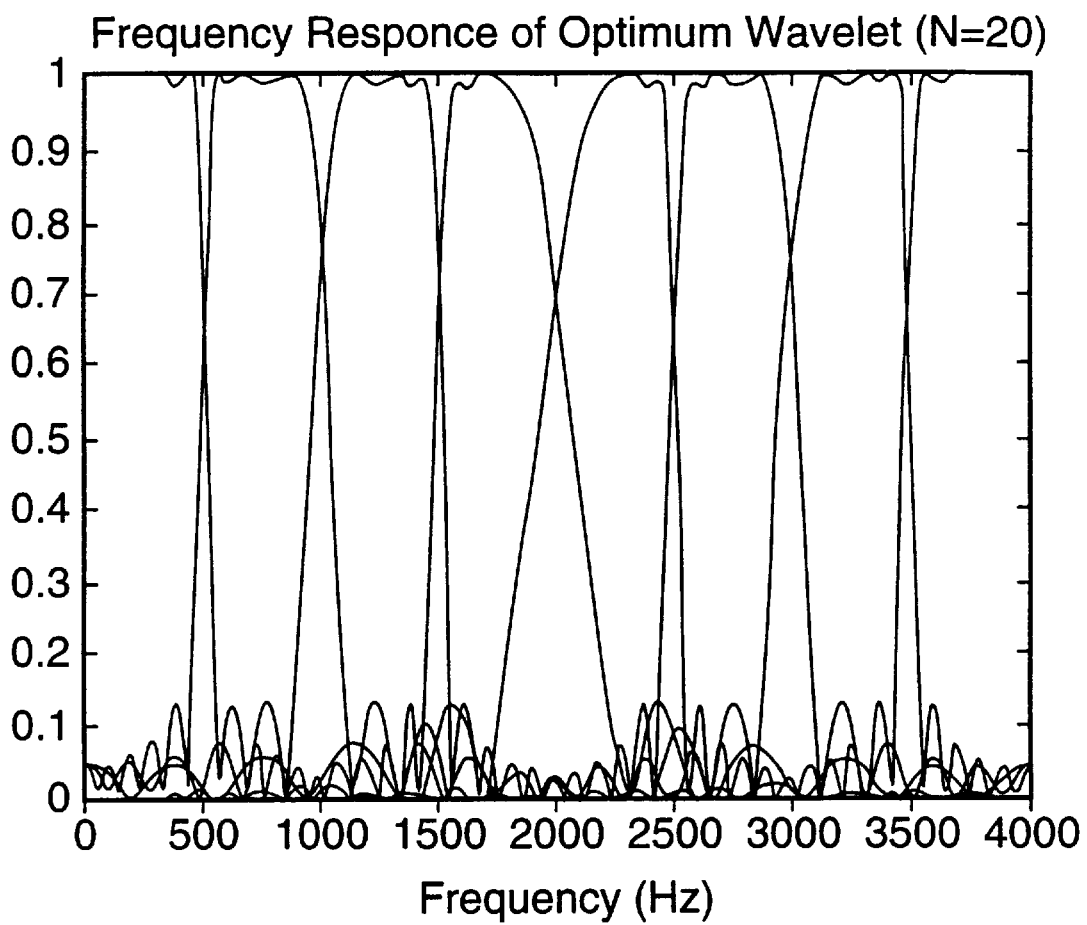
FIG. 4 shows the frequency response of an optimum wavelet decomposed in accordance with FIG. 3 using FIR filters of length N=20.

FIG. 4 shows the frequency response of an optimum wavelet decomposed in accordance with FIG. 3 using FIR filters of length N=20. Viewed in the frequency domain as a filter bank, the process of wavelet decomposition into wavelet "packets" actually allows the bands to overlap somewhat, while the process of down sampling allows aliasing to occur. The re-construction process provides cancellation of aliased components resulting in perfect restoration of the original signal.

Figure 5A:
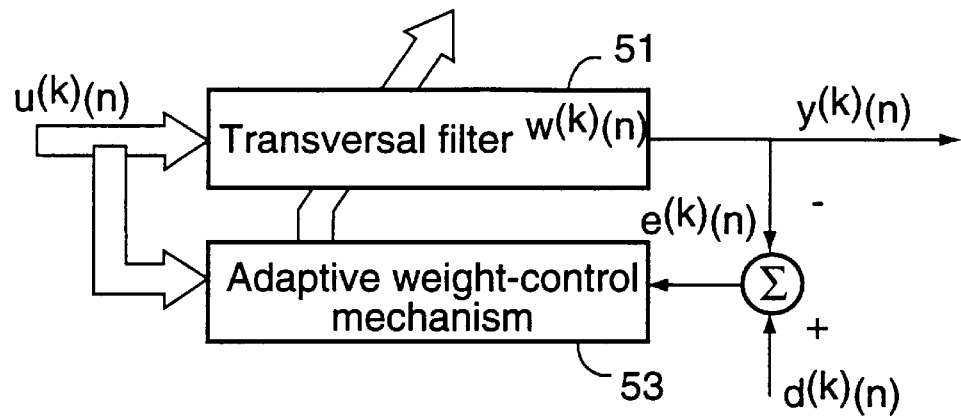
FIG. 5(a) is a block diagram thereof and FIG. 5(b) shows the detailed structure of the transversal filter component thereof.
Figure 5B:
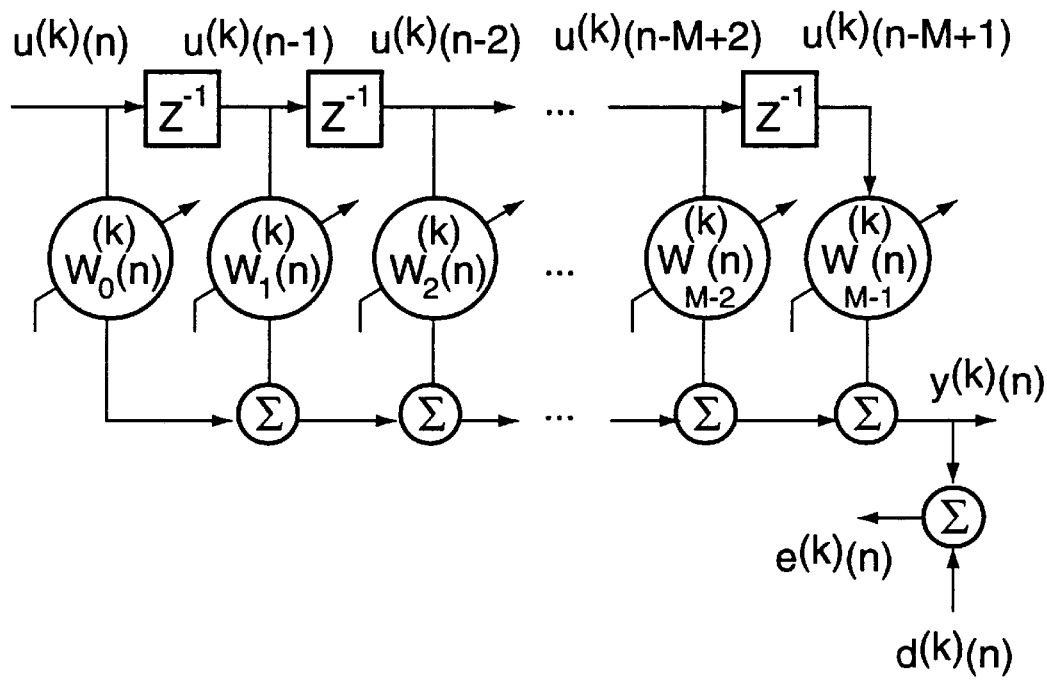

FIG. 5(a) shows an adaptive transversal filter 51 (shown in greater detail with reference to FIG. 5(b)) with unspecified adaptive weight control mechanism 53, using a well known structure. The adaptive weight control mechanism 53 can be implemented using any of a number of commonly known designs. In the preferred embodiment, an LMS structure is used because of its simplicity, with adaptation step size normalized to signal power. However, any other variant of LMS algorithm may advantageously used.

Figure 6:
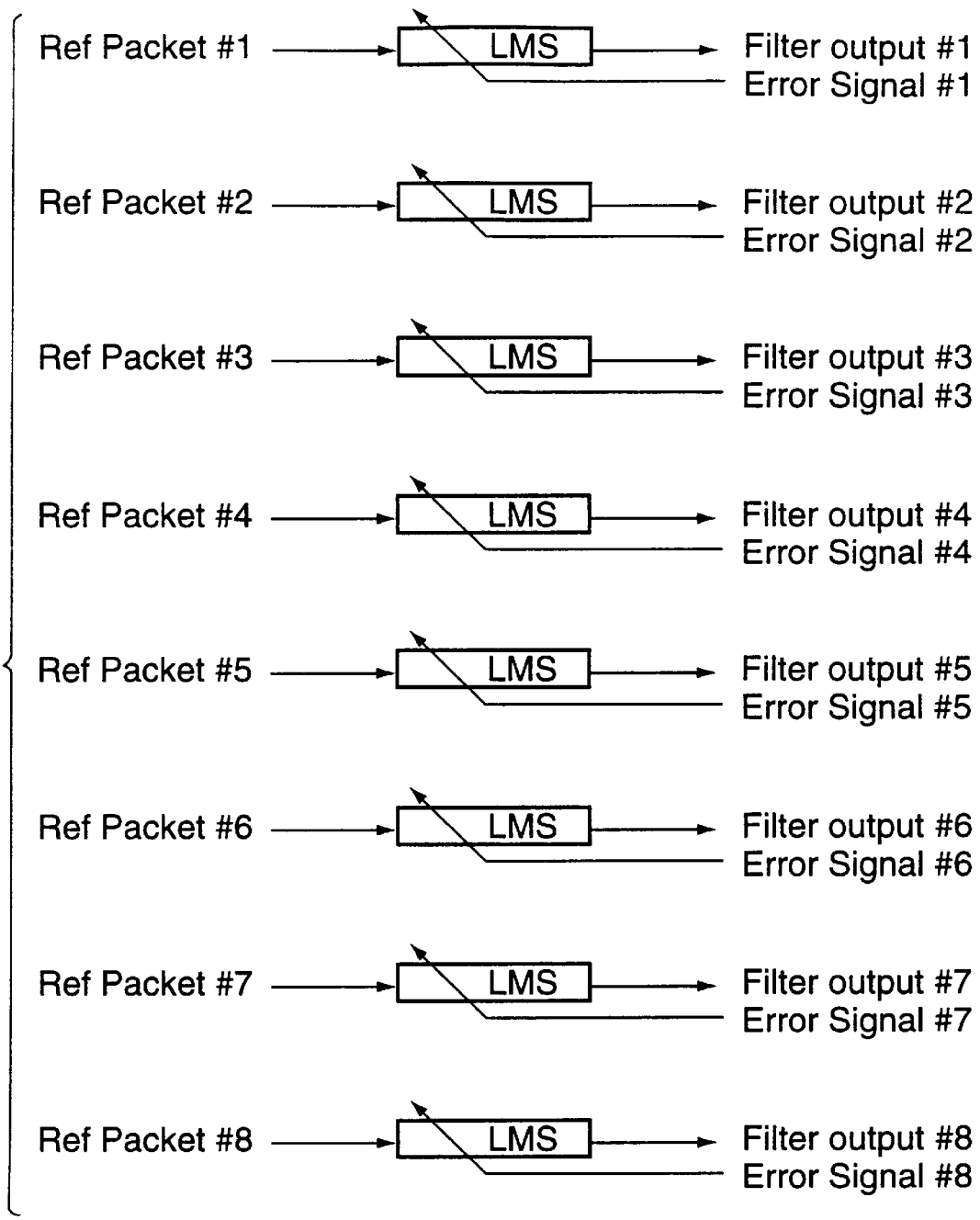
FIG. 6 shows a bank of adaptive filters according to the present invention.

FIG. 6 shows a bank of adaptive filters used in one embodiment of a sub-band echo canceller according to the present invention. In FIG. 6, each of the eight LMS adaptive filters receives a reference packet signal $u^{(k)}(n)$ (ie. Ref Packet #1, Ref Packet #2, etc.) and an error signal $e^{(k)}(n)$ (ie. Error Signal #1, Error Signal #2, etc.), and in response generates a filter output $y^{(k)}(n)$ (ie. Filter Output #1, Filter Output #2, etc.).

Figure 7:
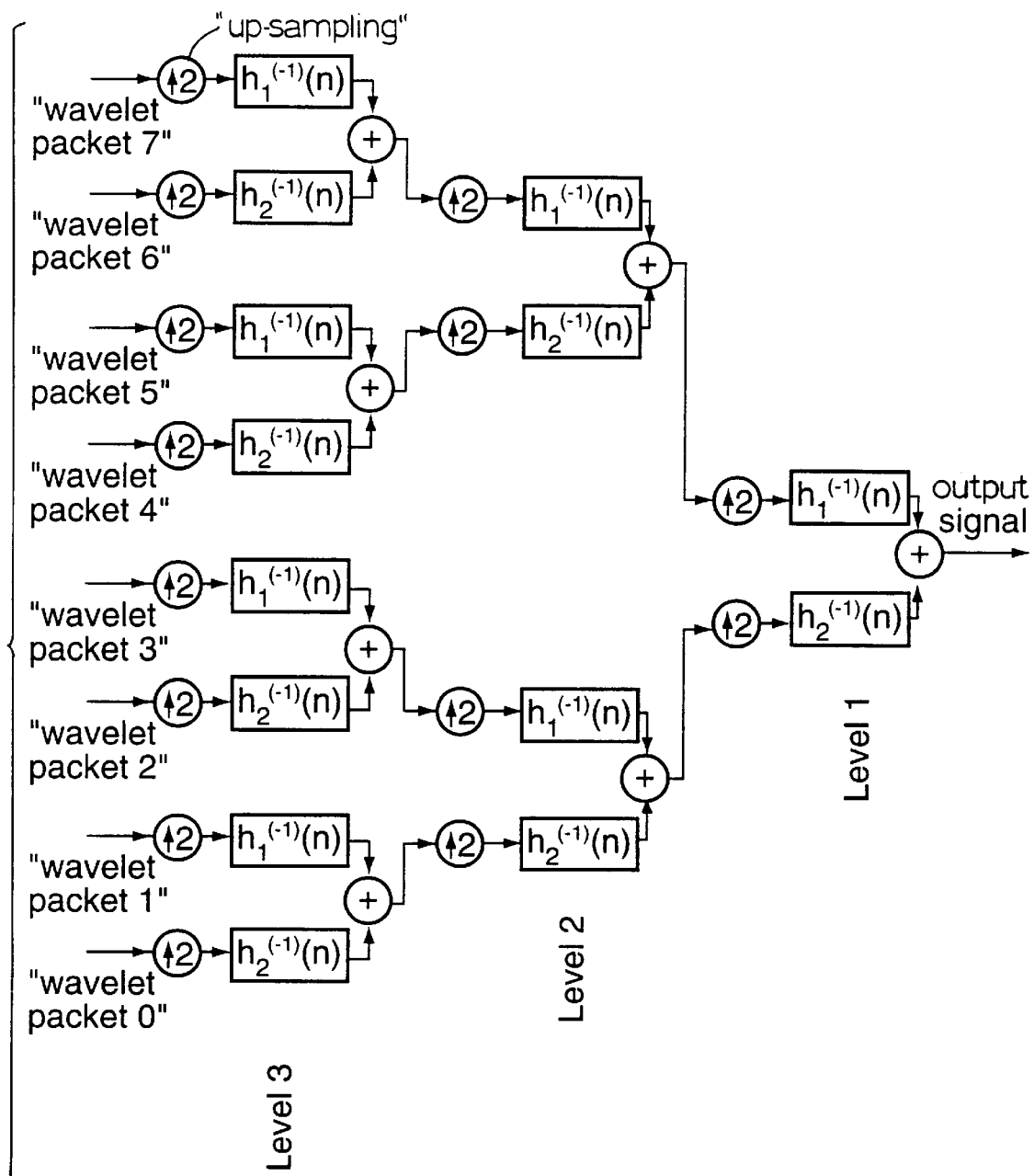
FIG. 7 is a schematic representation of a three level signal reconstruction in which a signal is reconstructed from eight wavelet packets, in accordance with the present invention.

FIG. 7 shows a signal reconstruction using wavelet reconstruction, according to the principles of the present invention. Three levels are shown, and identical FIR filters are used for each level, namely $h_1^{(-1)}(n)$ and $h_2^{(-1)}(n)$. It will be noted that these FIR filters are the time reverse of the decomposition filters $h_1(n)$ and $h_2(n)$ depicted in FIG. 3. As shown in FIG. 7, up sampling by a factor of 2 is performed before each reconstruction level (ie. effected by inserting a zero between each signal sample).

According to the present invention, each wavelet is designed in such a fashion as to optimize echo cancellation performance for each particular application, in accordance with the following criteria:
1) Minimum distortion due to aliasing of frequency components from other bands after down-sampling, such that the MSE (Mean Square Error) of the residual echo signal is minimized after echo cancellation.
2) Minimization of the number of coefficients of the wavelet (i.e. the filter coefficients in the FIR filters used for decomposition and reconstruction).
3) Allowing the wavelet to become Quasi-Orthogonal, as opposed to the usual assumption of orthogonality, such that the capability of "perfect reconstruction" is purposely reduced, thus allowing further minimization of aliasing of frequency components. This increases reconstruction error, but decreases aliasing error, thus increasing echo cancellation.

The wavelet coefficients used in the preferred embodiment were:

Father Wavelet:
$\bar{h}_1$=[−0.0004, 0.0771, 0.0101, −0.1475, −0.0657, 0.1128, −0.0308, −0.4977, −0.7157, 0.3840, 0.0754, 0.1743, 0.0179, −0.0280, 0.0367, 0.0110, −0.0753, −0.0226, 0.0445, 0.0046]

Mother Wavelet:

$$h_2[n]=(-1)^{1-n}h_1[1-n]$$

where $h_1[n]$ is the nth element of vector $\bar{h}_1$.

The optimum filter $\bar{h}_1$ is obtained as follows: Let the length of the filter be N. The filter $\bar{h}_1$ which minimizes aliasing in sub-band decomposition is the one which keeps most of its energy in low-pass frequency band, i.e.

$$\frac{\max}{\bar{h}_1} \frac{1}{2}\pi \int_{-\frac{\pi}{2}}^{\frac{\pi}{2}} |H_1(\omega)|^2 \, d\omega \quad (1)$$

under the bi-orthogonal constrain:

$$\sum_n h_1(n-2l)h_1(n) = \begin{cases} 1 & l \neq 0 \\ o & l = 0 \end{cases} \quad (2)$$

In Equation (1), $$H_1(\omega) = \sum_n h_1[n] e^{-j\omega n}$$

is the Fourier transform of $\bar{h}_1$. Since $$\frac{1}{2\pi} \int_{-\frac{\pi}{2}}^{\frac{\pi}{2}} |H_1(\omega)|^2 \, d\omega = \sum_n \sum_k h_1[n]h_1[k] \int_{-\frac{\pi}{2}}^{\frac{\pi}{2}} e^{j\omega(n-k)} \frac{d\omega}{2\pi}$$

we can re-write Eq. 1 as $$\frac{\max}{\bar{h}_1} \bar{h}_1 \Sigma \bar{h}_1^T \quad \square$$

where $^T$ represents the vector transpose and $\Sigma$ is an N×N matrix with its $k^{nth}$ element being $$\Sigma[k,n] = \frac{1}{2\pi} \int_{-\frac{\pi}{2}}^{\frac{\pi}{2}} e^{j\omega(n-k)} \, d\omega = \frac{1}{2} \frac{\sin(n-k)\frac{\pi}{2}}{(n-k)\frac{\pi}{2}}$$

The optimum problem of Eq. 3 under the constrain of Eq. 2 can be formulated as the following normalized penalty algorithm $$\frac{\max}{\bar{h}_1} \left\{ \frac{\bar{h}_1 \Sigma \bar{h}_1^T}{\bar{h}_1 \bar{h}_1^T} - \lambda \sum_{l=1}^{\frac{N-1}{2}} \left( \frac{\sum_{n=2l}^{N-1} h_1[n-2l]h_1[n]}{\bar{h}_1 \cdot \bar{h}_1^T} \right)^2 \right\} \quad (4)$$

where $\lambda$ is the penalty term which controls the bi-orthogonal constrain of Eq. 2.

Figure 8:
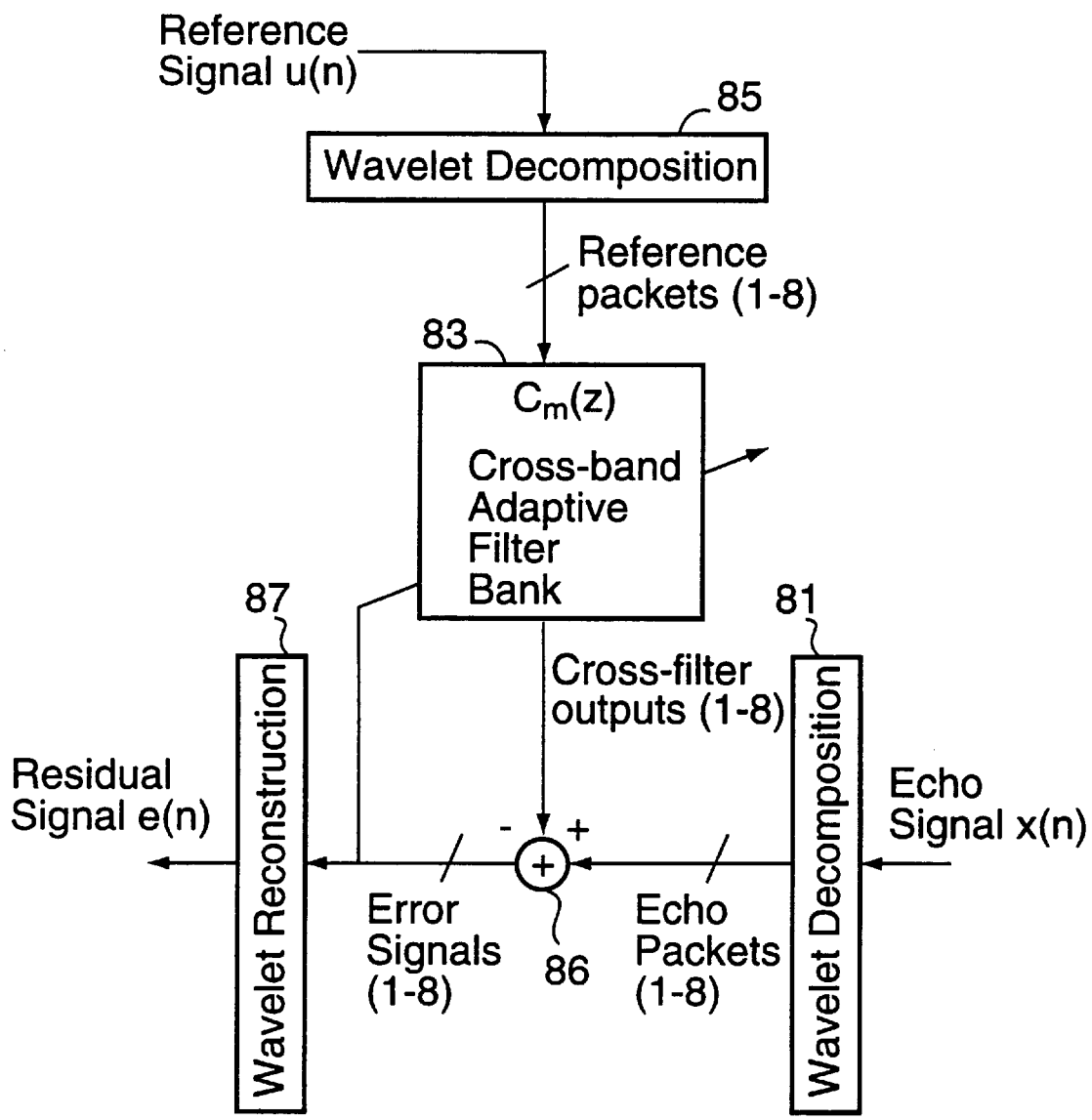
FIG. 8 is a block diagram of a cross-band echo canceller according to the preferred embodiment.

According to the preferred embodiment, a "cross-band" echo canceller topology is provided for dramatically increasing the amount of echo cancellation using wavelet decomposition. FIG. 8 shows the basic configuration. This diagram differs from FIG. 2 in that the adaptive filtering block 83 is of modified design from the adaptive filter bank 23. The wavelet decomposition blocks 81 and 85, wavelet reconstruction block 87 and multiple subtraction blocks 86 are identical to blocks 21, 25, 27 and 26, respectively, in FIG. 2. The structure of the cross-filter 83 is shown in detail with reference to FIG. 9. The eight reference wavelet packets are received by the cross-filter 83 in the same manner as FIG. 2. Furthermore, the cross-filter includes a plurality of adaptive filters designated as $C_{k,k}$ in the diagram, equivalent to the adaptive LMS filters in the embodiment of FIG. 6. However, the cross-filter of the preferred embodiment also includes a plurality of additional "cross-band" adaptive filters (labelled $C_{k,k+1}$ and $C_{k,k-1}$). These additional adaptive filters are used to cancel "cross-band" signals between the adjacent wavelet packets.

Figure 9:
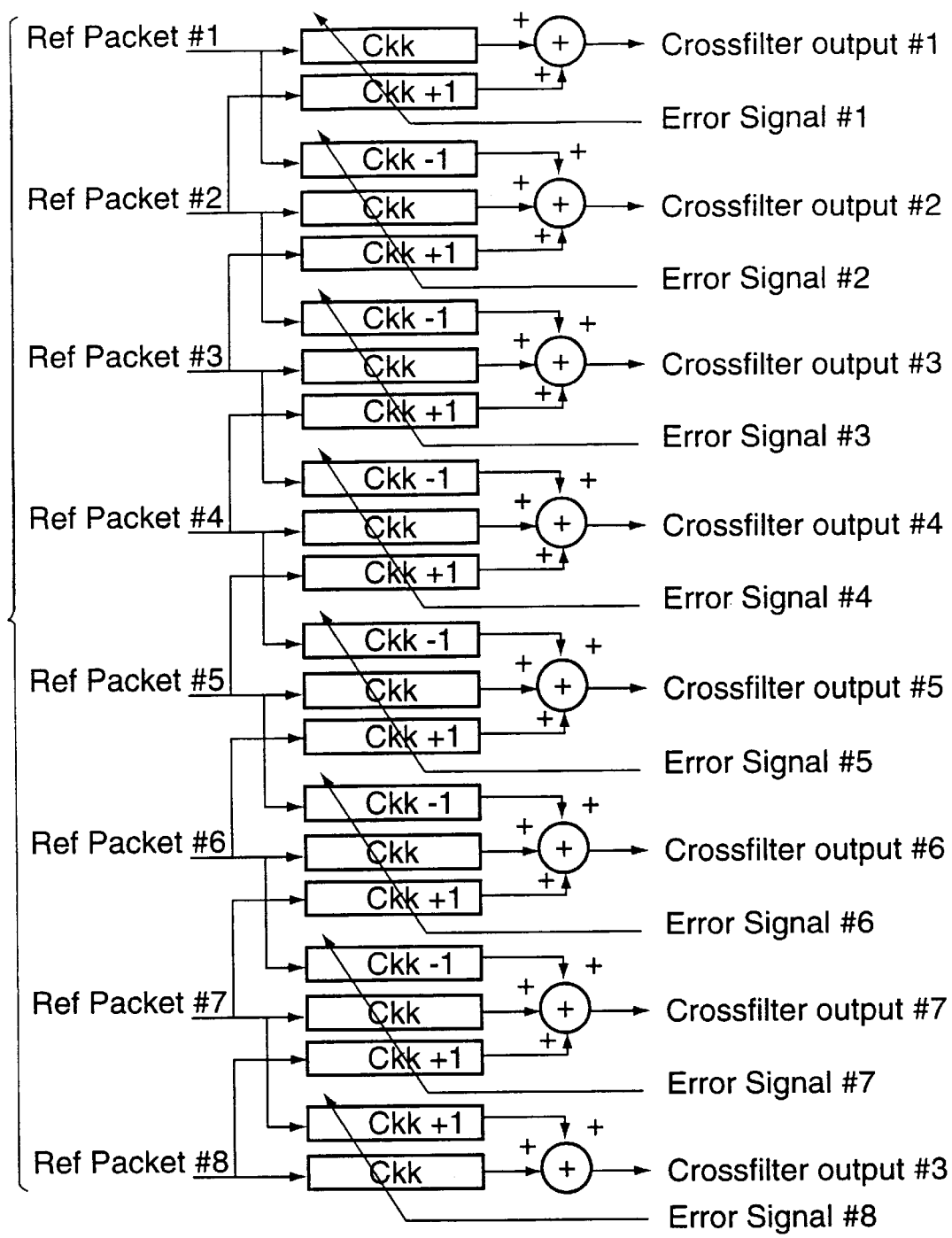
FIG. 9 shows the structure of an adaptive filter bank for the cross-band echo canceller of FIG. 8.

A surprising result of using the optimized wavelet set forth above, is that it is not necessary to provide a full matrix of adaptive filters connected between all wavelet packets. Such a matrix configuration would require a total of 64 adaptive filters. Since the optimized wavelet of the present invention is characterized by controlled aliasing, cross-band cancellation is required only between adjacent wavelet packets. This reduces the required number of adaptive filters to 22, as shown in FIG. 9.

Figure 10:
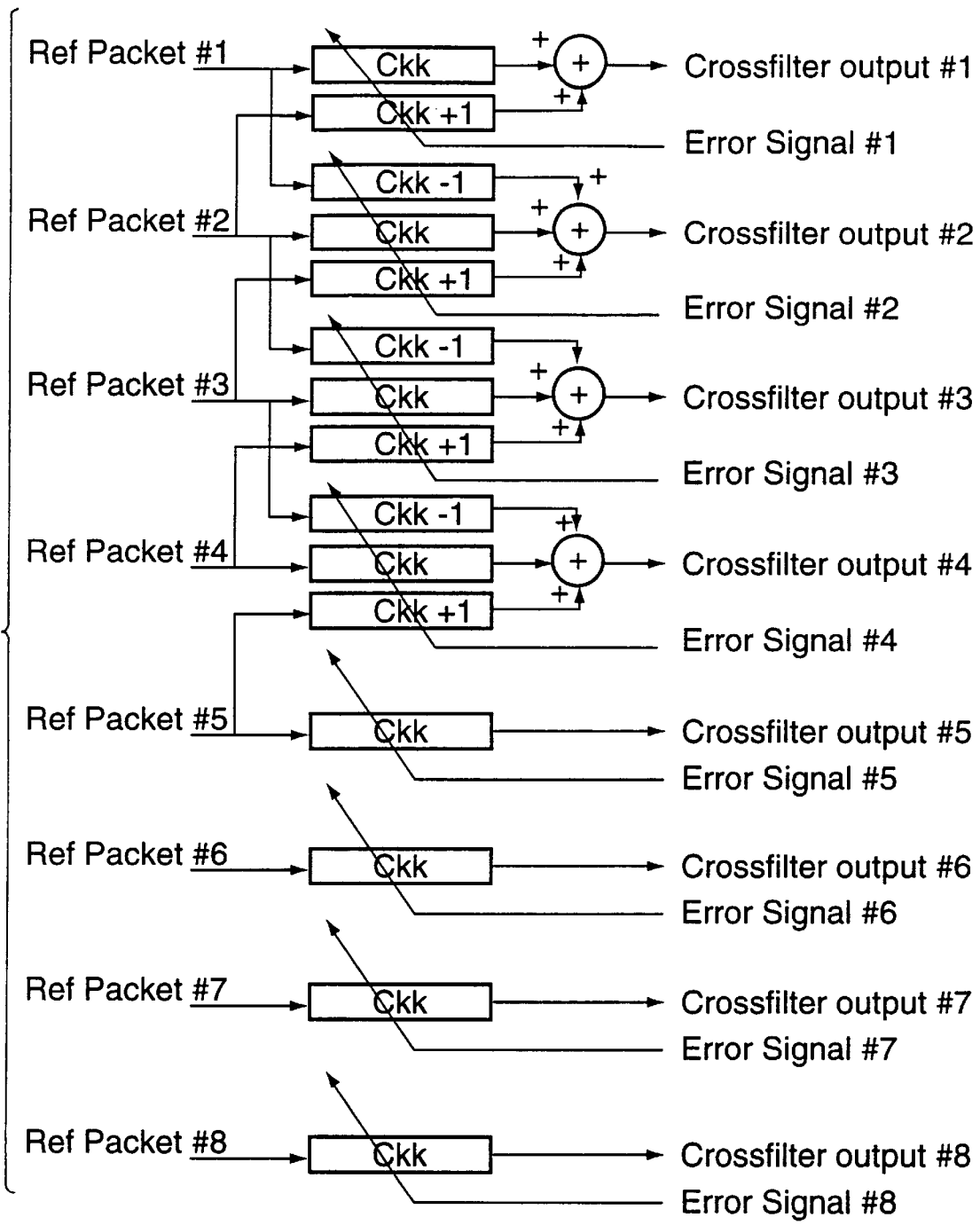
FIG. 10 shows the structure of an alternative adaptive filter bank for the cross-band echo canceller of FIG. 8.

Furthermore, the inventors have discovered that for echo cancellation of speech, "cross-band" components have less significance in the higher frequency bands, such that some of the cross-band adaptive filters $C_{k,k+1}$ and $C_{k,k-1}$ can be eliminated without significantly compromising performance. An example of this reduced complexity echo canceller is shown in FIG. 10, which is identical to the echo canceller of FIG. 9, except that the cross-band adaptive filters $C_{k,k+1}$ and $C_{k,k-1}$ have been eliminated for processing reference wavelet packets Ref Packet #5, Ref Packet #6, Ref Packet #7 and Ref Packet #8. It is possible to implement echo cancellers characterized by various performance levels by eliminating a fewer or greater number of the cross-band adaptive filters. The computational load of the echo canceller can vary between 2M/N and 5M/N depending upon the number of cross-band adaptive filters used.

Figure 11A:
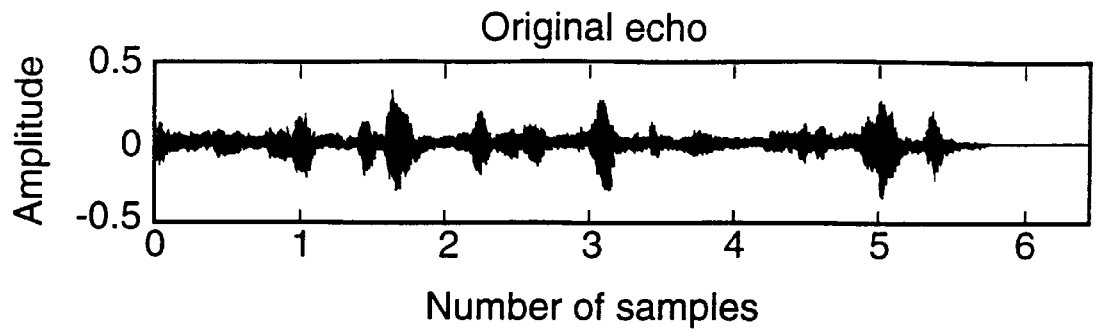
FIG. 11 shows simulated test results using the crossband echo canceler of the preferred embodiment.
Figure 11B:
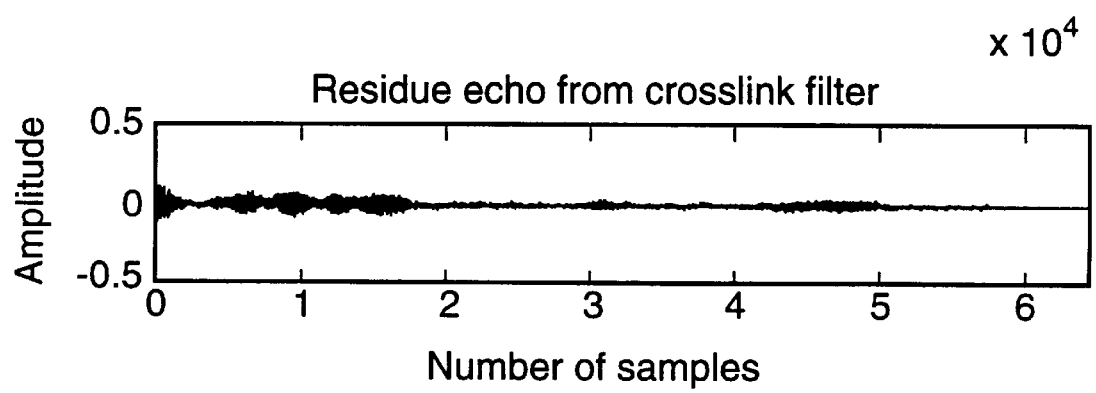
Figure 11C:
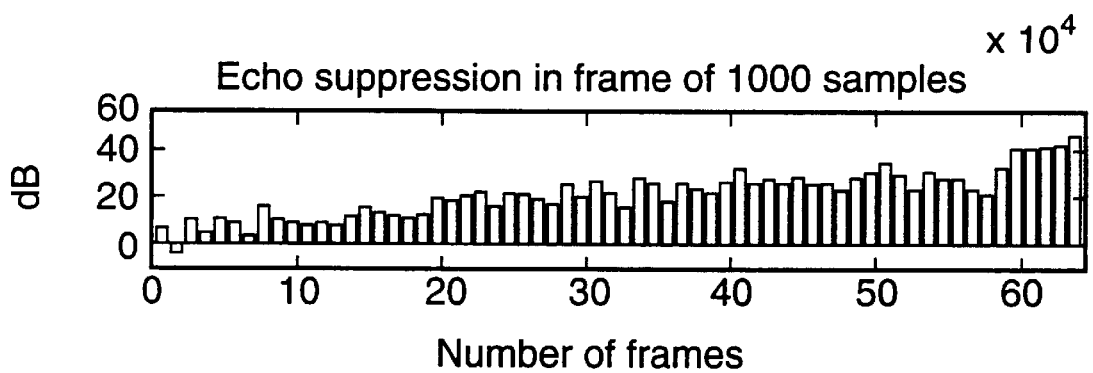

FIG. 11 shows test results from the cross-band echo canceller structure of FIG. 10, using a simulation based on a linear model of a typical echo channel. The top signal is an 8 second sample of speech from the echo signal path. The middle signal is the echo residual signal after echo cancellation, and the bottom graph shows the ERLE in dB based upon blocks of 1000 samples (ERLE is an acronym for Echo Return Loss Enhancement, which is a commonly known method of measuring the performance of an echo canceller). This ERLE measurement expressed in dB represents the amount that an echo signal has been reduced.

Figure 12A:
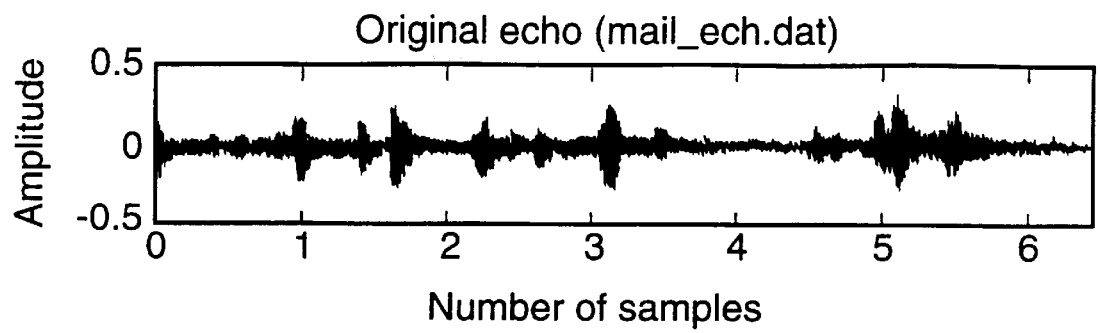
FIG. 12 shows actual test results for an echo signal captured from a telephone echo channel using the crossband echo canceller of the preferred embodiment.
Figure 12B:
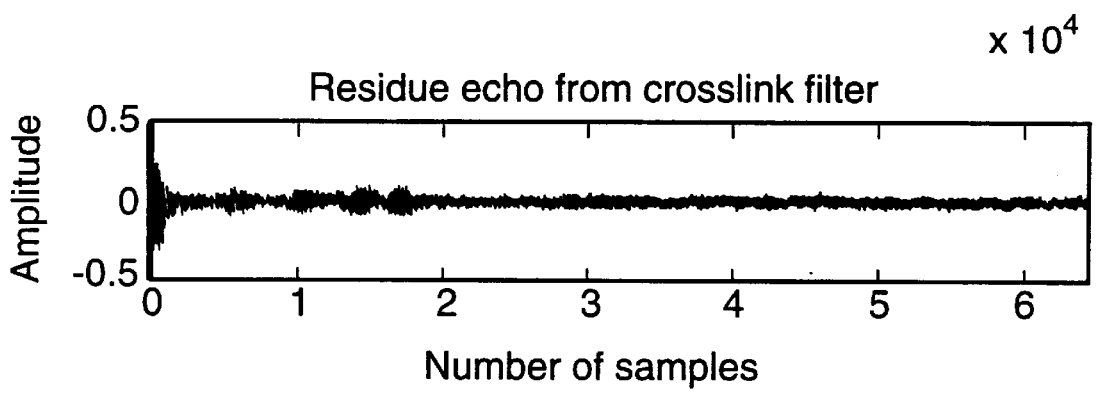
Figure 12C:
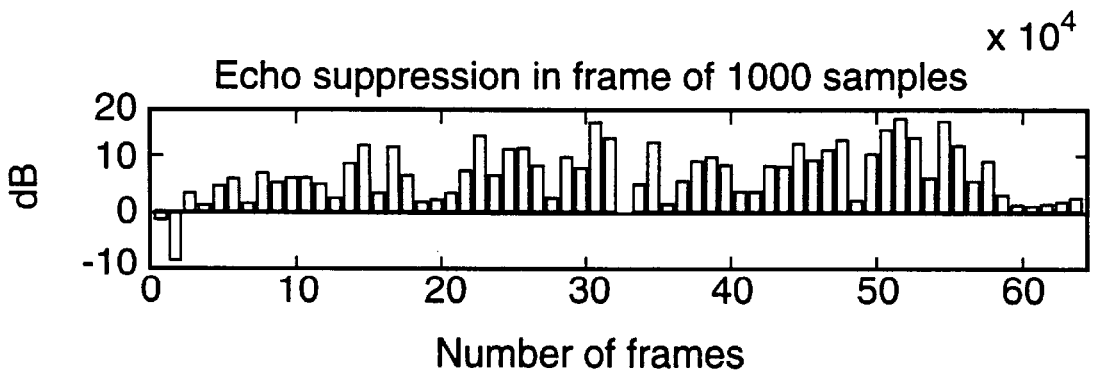

FIG. 12 shows test results using the same 8 second reference signal, wherein the echo signal (top signal) is captured from a real telephone echo channel. This echo channel is typically characterized by small non-linearities, and some background (near-end) noise which reduces the amount of echo cancellation achievable. The middle signal of FIG. 12 shows the echo residual after cancellation, and the bottom graph shows the ERLE in dB based upon blocks of 1000 samples.

As discussed above, by using the optimized wavelet set forth above, it is not necessary to provide a full matrix of adaptive filters connected between all wavelet packets. The design of a wavelet can be further optimized for use with the cross-band adaptive filter bank structure, according to the following criteria:

1) Minimum distortion due to aliasing of frequency components from other bands (beside the adjacent bands) after down-sampling, such that the MSE (Mean Square Error) of the residual signal is minimized after echo cancellation.
2) Minimization of the number of samples of the wavelet (i.e. the filter coefficients in FIR filters used for decomposition and reconstruction).

The wavelet coefficients used for cross-cancellation in the preferred embodiment were:

Father Wavelet:

$$\overline{h}_1[-0.0095, -0.0059, 0.0212, 0.0088, -0.0113, 0.0664, 0.0839,$$
$$-0.1775, -0.4096, -0.1139, 0.4672, 0.6233, 0.3115, 0.0998,$$
$$0.1574, 0.1760, 0.0688, 0.0116, 0.0261, 0.0197]$$

Mother Wavelet:

$$h_1[n] = (-1)^{1-n} h_1[1-n]$$

where $h_1[n]$ is the nth element of vector $\overline{h}_1$

For the cross-band structure, a certain amount of aliasing is permitted into adjacent bands such that the aliasing into the other bands can be minimized. The algorithm for designing the corresponding $h_1$ is similar to Eq. 4 discussed above, except that the $k^{nth}$ element of $\Sigma$ is $$\Sigma[k, n] = \frac{1}{2} \frac{\sin[\alpha(n-k)\pi]}{\alpha(n-k)\pi}$$

where $\alpha$ is chosen based on how many levels of wavelet decomposition are employed, which, in turn, determines the bandwidth of each sub-band.

In the previous structure discussed above with reference to FIG. 7 and Eq. 4, in order to minimize the aliasing from one sub-band to other sub-bands, $\alpha$ must be set at $\alpha=0.5$. In the cross-band structure, this constrain can be relaxed such that aliasing is allowed into adjacent bands so that aliasing in other bands can be further reduced. For a three level wavelet decomposition with eight sub-bands, the normalized single side bandwidth of each sub-band is $\frac{1}{8}=0.125$. In order that one sub-band does not interfere with other sub-bands except the adjacent sub-bands, $\alpha$ must be constrained to $\alpha-0.5<0.125$. Once $\alpha<0.625$ is satisfied, any increase in $\alpha$ results in a lessening of aliasing in other bands. According to the most preferred embodiment, $\alpha=0.62$.

In summary, according to the present invention, wavelet decomposition and reconstruction have been utilized to successfully implement a speech echo canceller by developing an "optimum" wavelet. The decomposition/reconstruction process is implemented using FIR filters, the filter coefficients of which are derived from this "optimum" wavelet. A method of "cross-band" cancellation is provided in accordance with the preferred embodiment, such that distortion is reduced between adjacent bands caused by processing of the wavelet packets. This results in higher levels of echo cancellation over prior art systems (ie. higher values of ERLE are obtained).

A person understanding the principles of the present invention may conceive of alternative embodiments or variations thereof without departing from the sphere and scope as set forth in the claims appended hereto.

We claim:

1. An echo canceller comprising:
   a first wavelet decomposition block for decomposing a reference signal into a plurality of reference wavelet packets;
   a second wavelet decomposition block for decomposing an echo signal of said reference signal into a plurality of echo wavelet packets;
   an adaptive filter bank for receiving and filtering said plurality of reference wavelet packets and in response generating a plurality of filtered wavelet packets replicating said echo wavelet packets, said adaptive filter bank being characterized by a transfer function;
   a plurality of subtracters for receiving and subtracting respective ones of said filtered wavelet packets from said echo wavelet packets and in response generating and applying a plurality of error signals to said adaptive filter bank for modifying the transfer function of said adaptive filter bank for continued replication of said echo wavelet packets; and
   a wavelet reconstruction block for receiving and reconstructing said plurality of error signals to form a residual signal from which said echo signal of said reference signal has been cancelled;
   wherein each of said first and second decomposition blocks comprises:
      a first level comprising a first pair of FIR filters for convolving an input signal with a mother wavelet and a father wavelet, respectively, said first pair of FIR filters being characterized by coefficients corresponding to said mother and father wavelets, respectively; and a first pair of down-samplers for down-sampling the convolved signals by two;
      a second level comprising two further pairs of FIR filters, each of said further pairs of FIR filters being identical with said first pair of FIR filters for convolving the down-sampled signals from said first level with said mother wavelet and said father wavelet, respectively, and two further pairs of down-samplers for down-sampling the further convolved signals by two;

a third comprising four further pairs of FIR filters, each of said further pairs of FIR filters being identical with said first pair of FIR filters for convolving the further down-sampled signals from said second level with said mother wavelet and said father wavelet, respectively, and two further pairs of down-samplers for down-sampling the further convolved signals by two for generating eight output wavelet packets.

2. The echo canceller of claim 1, wherein said reconstruction blocks comprises:

a first level comprising four pairs of up samplers for up sampling eight input wavelet packets representing said plurality of error signals, four pairs of additional FIR filters for convolving the up sampled wavelet packets from said four pairs of up samplers with respective time reverse mother and father wavelets, respectively, the coefficients of each of said pairs of additional FIR filters corresponding to the time reverse of said coefficients of said first pair of FIR filters, respectively, and four adders for summing the signal outputs from respective ones of said pairs of additional FIR filters;

a second level comprising two further pairs of up samplers for up sampling the sum signals output from respective ones of said adders, two further pairs of additional FIR filters, each of said further pairs of additional FIR filters being identical with respective ones of said four pairs of additional FIR filters for convolving the up sampled sum signals from said two further pairs of up samplers with said time reversed mother and father wavelets, respectively, and two further adders for summing the signal outputs from respective ones of said two further pairs of additional FIR filters; and a third level comprising an additional pair of up samplers for up sampling the sum signals output from respective ones of said two further adders, a further pair of additional FIR filters, each of said further pair of additional FIR filters being identical to respective ones of said four pairs of additional FIR filters for convolving the up sampled sum signals from said additional pair of up samplers with said time reversed mother and father wavelets, respectively, and one further adder for summing the signal outputs from said further pair of additional FIR filters and in response generating said residual signal.

3. The echo canceller of claim 1, wherein said FIR filter coefficients are characterized by said father wavelet being: $h_1[n]=[-0.0160, 0.0367, -0.0142, -0.0387, -0.0309, 0.0411, -0.0445, -0.0473, 0.0588, 0.0598, -0.0762, -0.0829, 0.0970, 0.1304, -0.1202, -0.2418, 0.1101, 0.5976, 0.6492, 0.2829]$, and said mother wavelet being:

$$h_2[n]=(-1)^{1-n} h_1[1-n].$$

4. The echo canceller of claim 1, wherein said adaptive filter bank comprises a plurality of transversal filters, each of said filters having a signal input for receiving a respective one of said reference wavelet packets, a signal output for generating a respective one of said plurality of filtered wavelet packets, and an adaptive weight control input for receiving a respective one of said error signals and in response modifying said transfer function.

5. The echo canceller of claim 4, wherein each of said transversal filters utilizes an LMS structure with adaptation step size normalized to signal power.

6. The echo canceller of claim 4, wherein said adaptive filter bank further includes a plurality of additional adaptive filters for cancelling cross-band signals between predetermined adjacent ones of said reference wavelet packets.

7. The echo canceller of claim 6, wherein said FIR filter coefficients are characterized by said father wavelet being: $h_1[n]=[-0.0095, -0.0059, 0.0212, 0.0088, -0.0113, 0.0664, 0.0839, -0.1775, -0.4096, -0.1139, 0.4672, 0.6233, 0.3115, 0.0998, 0.1574, 0.1760, 0.0688, 0.0116, 0.0261, 0.0197]$, and said mother wavelet being:

$$h2[n]=(-1)^{1-n}h1[1-n].$$

* * * * *